June 19, 1923.  M. L. MARTUS  1,459,512

PRIMARY BATTERY

Filed Dec. 9, 1921

INVENTOR
Martin L. Martus

BY
Chamberlain & Newman ATTORNEYS.

Patented June 19, 1923.

1,459,512

UNITED STATES PATENT OFFICE.

MARTIN L. MARTUS, OF WOODBURY, CONNECTICUT.

PRIMARY BATTERY.

Application filed December 9, 1921. Serial No. 521,076.

*To all whom it may concern:*

Be it known that MARTIN L. MARTUS, a citizen of the United States, and resident of Woodbury, in the county of Fairfield and State of Connecticut, has invented certain new and useful Improvements in Primary Batteries, of which the following is a specification.

My invention relates to improvements in primary batteries of that class in which the negative electrode consists of a cylindrical form of oxide of copper or other depolarizing agent and the positive electrode consists of a cylindrical form of zinc, of a diameter preferably larger than that of the negative electrode so as to permit of the one being arranged and supported within the other, and whereby their side faces will be disposed directly opposite each other and thus better co-operate in conjunction with a suitable active solution such as is employed in batteries of this type.

The object of the invention is to provide a simple, practical and inexpensive form of battery of the above class and particularly to provide means for assembling the same so as to form an assemblage of elements and parts which may be readily supported from the cover and within a battery jar by a single suspending means such as a central rod or hanger.

Another feature is to provide a novel form of suspending rod whereby the positions of the several elements are properly fixed with relation to each other and uniformity of their assemblage insured.

A further feature of the invention is to provide a form of supporting yoke or bridge for the positive electrode which may be connected therewith when casting the zinc so as to form a complete element with yoke attached, ready to be assembled in a way to lessen the labor of assembling.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a central vertical section through a battery jar cover, with my simplified and improved form of assembled cylindrical elements attached;

Figure 1:
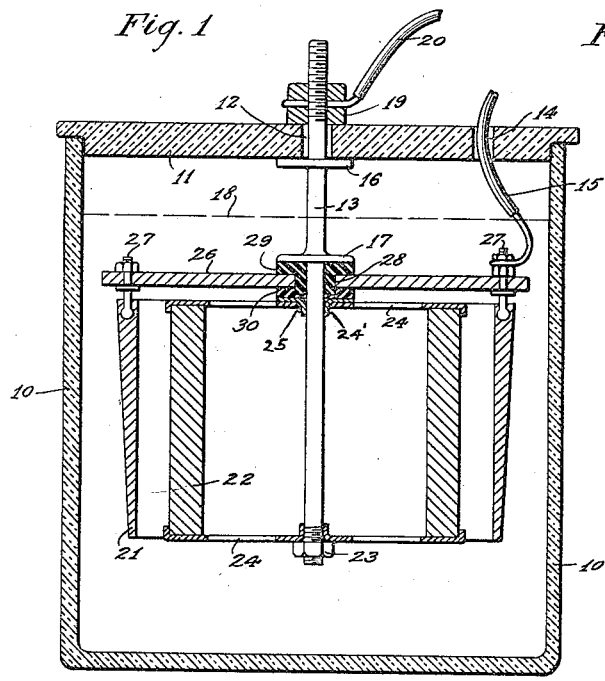
Figure 5:
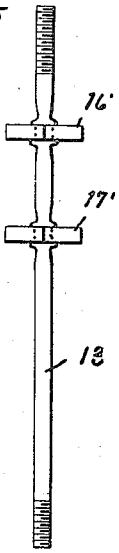
Fig. 5 shows a modified form of suspending rod designed to be constructed of three parts.

We have shown in the drawing by dotted lines the general outline of a battery jar 10 which may obviously be larger or smaller as occasion may require. 11 represents a cover which is usually made of porcelain but provided with a central hole 12 for the central suspending rod 13 of a so-called single suspension form of assembled element. 14 represents a second hole in the cover through which the line wire 15 from the positive pole of the battery is extended.

The central suspending rod is of special construction and includes an upper annular shoulder 16 and a lower annular shoulder 17. These shoulders are properly spaced apart, the upper one being in position to engage the under side of the cover and the lower one is at a required distance from the upper one to insure the proper positioning of the assembled elements within a battery with reference to the solution line 18, that necessarily comes above the element to completely submerge the same. These shoulders may be formed integral with the rod as shown in Fig. 1 or may be made of three parts, viz: a rod 13', nuts or spacers 16' and 17' which are held in place by swading operations on the rod. The upper portion of the rod 16 is threaded to receive a nut 19 for securing the rod to the cover and likewise for the accommodation of other nuts employed for binding a field wire 20 to this pole of the element. From this construction it will be seen that the assembled element may readily be connected to and disconnected from the cover by means of the single clamping nut 19 herebefore mentioned.

Both the positive and negative cylindrical electrodes 21 and 22 are supported upon the suspending rod 13 and are detachably secured thereto by means of a single nut 23 that is screwed on to the lower threaded end of the rod. The negative electrode 22 is of cylindrical form and is provided with a cap 24 upon each end. The caps may be alike in construction and include an interned edge portion to cover the outer edge of the negative cylinder and are also provided with central aligned holes 25 to receive the suspension rod 13 before mentioned and to form an electrical connection therewith. This electrical connnection is particularly insured by flaring in the edge portion of the cap surrounding the holes 25 to better engage the rod, or a separate metal washer 24' may be set in the hole 25 as shown in the upper cap 24.

The positive or zinc electrode 21 is also of cylindrical form and is preferably formed tapered from top to bottom so as to be thicker through its top edge portion than its lower edge portion.

Figure 2:
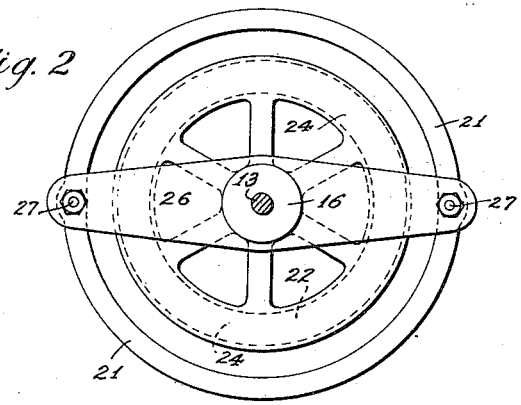
Fig. 2 shows a plan view of the assembled elements shown in Fig. 1.
Figure 3:
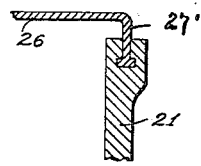
Fig. 3 shows a slightly enlarged sectional detail of a modified form of means for connecting bridge piece to the cylindrical zinc electrode by casting operations.
Figure 4:
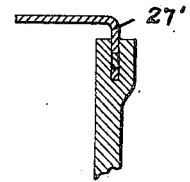
Fig. 4 shows a further sectional detail of means for anchoring ends of bridge piece in zinc.

A sheet metal yoke member 26 is provided for supporting this electrode from the rod, and has its end portions prepared for connection to studs 27 cast in the zinc as shown in Figs. 1 and 2 or for direct connection with the zinc at the time of casting the zinc as seen in Figs. 3 and 4. In the last named form it will be seen that the downwardly deflected end portions 27' of the yoke are suitably anchored in the zinc in a way which will prevent the withdrawal. This yoke further includes a central hole 28 to align with the holes 25 in the caps 24 and serves to accomodate an insulation washer 29 positioned upon the rod, and against which a second insulating washer 30 is positioned to insulate the elements one from the other. The studs 27 are provided with nuts for attaching the yoke thereon as shown in Fig. 1 and may also include additional means for connecting the service wire 15 thereto.

Having thus described my invention, what I claim and desire to secure by Letters Patent is,

1. In a primary battery, a cylindrical form of zinc electrode, a metal bridge piece arranged across one end of the said electrode and having its integral connectable end portions cast integral with the zinc.

2. In an assembled battery element, a single central supporting rod, a single means for attaching it to a cover, a cylindrical form of positive and negative electrode, a single means for securing both electrodes to the rod, and means for insulating the electrode and rod one from the other.

3. In a cylindrical form of assembled primary battery element, the combination of a single central supporting rod, spacers on the rod, a cylindrical form of positive and negative electrode, insulators positioned against one of the spacers for insulating the positive or negative electrode, means for suspending both electrodes one within the other from the rod.

4. In a cylindrical form of assembled primary battery element, the combination of cylindrical forms of positive and negative electrodes, a single supporting rod extending through both said cylinders, means for insulating one electrode from the other, and electrically connected to the other electrode and supporting both of the electrodes.

5. The combination of a cylindrical form of negative electrode supporting plates covering the two ends thereon, a single central supporting rod engaging both of said plates and provided with means for detachably engaging a cover of a battery jaw, a cylindrical form of positive electrode within the negative electrode, a metallic bridge piece fastened across one end of said positive electrode and having a single hole therethrough for engaging the central rod, and insulators upon the central rod between the yoke, rod and plate.

6. In a cylindrical form of assembled primary battery adapted to be removably suspended from a cover of a battery jar, the combination of a single central supporting rod having its two end portions threaded and having spaced apart shoulders formed on its intermediate portion, an insulating member positioned upon the rod and against one of the shoulders, a cylindrical negative electrode mounted upon the insulation and rod, a cylindrical positive electrode surrounding the negative electrode, and a yoke supporting the positive electrode and also mounted upon the insulation.

7. In a cylindrical form of assembled primary battery adapted to be removably suspended from a cover of a battery jar, the combination of a single supporting rod having a shoulder formed upon one end portion to engage the cover of the battery jar, and a second shoulder to support the battery elements at a fixed distance below the cover, a cylindrical positive electrode insulatively mounted upon the rod, a cylindrical negative electrode also mounted upon the rod, insulating means upon the rod and between the two said positive and negative electrodes, and a single nut for securing the two said electrodes and the insulation in position upon the said rod.

Signed at Bridgeport, in the county of Fairfield and State of Connecticut, this seventh day of December A. D., 1921.

MARTIN L. MARTUS.

Witnesses:
C. M. NEWMAN,
LILLIAN M. ALLING.